Aug. 2, 1949.
G. C. WILHIDE
2,477,915
ILLUMINATED EYE SHIELD
Filed May 2, 1946
2 Sheets-Sheet 1
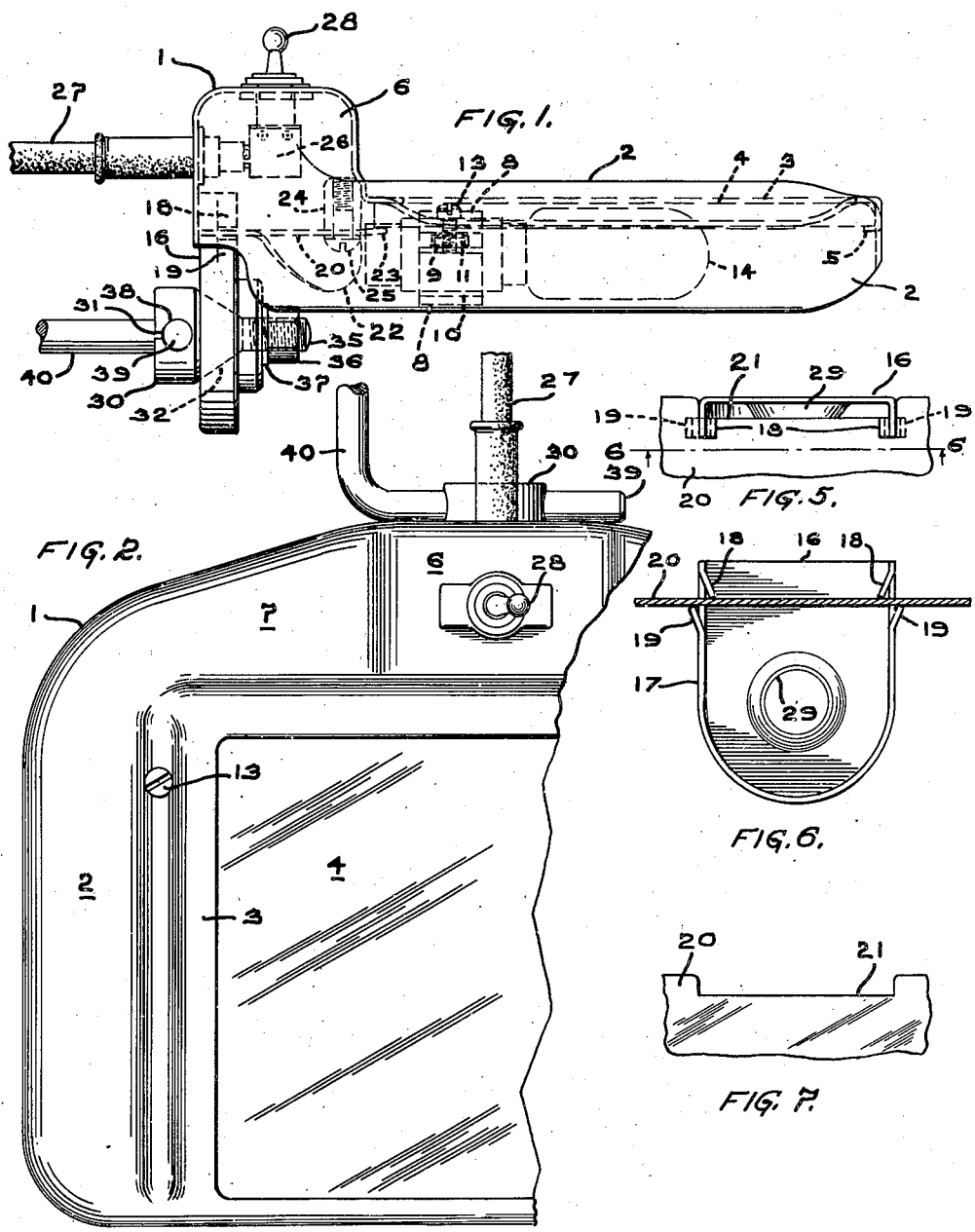
Inventor
Glenn C. Wilhide
By Thomas W. Y. Clark
Attorney
Witness
Porter H. Flaut Aug. 2, 1949.     G. C. WILHIDE     2,477,915
ILLUMINATED EYE SHIELD
Filed May 2, 1946     2 Sheets—Sheet 2
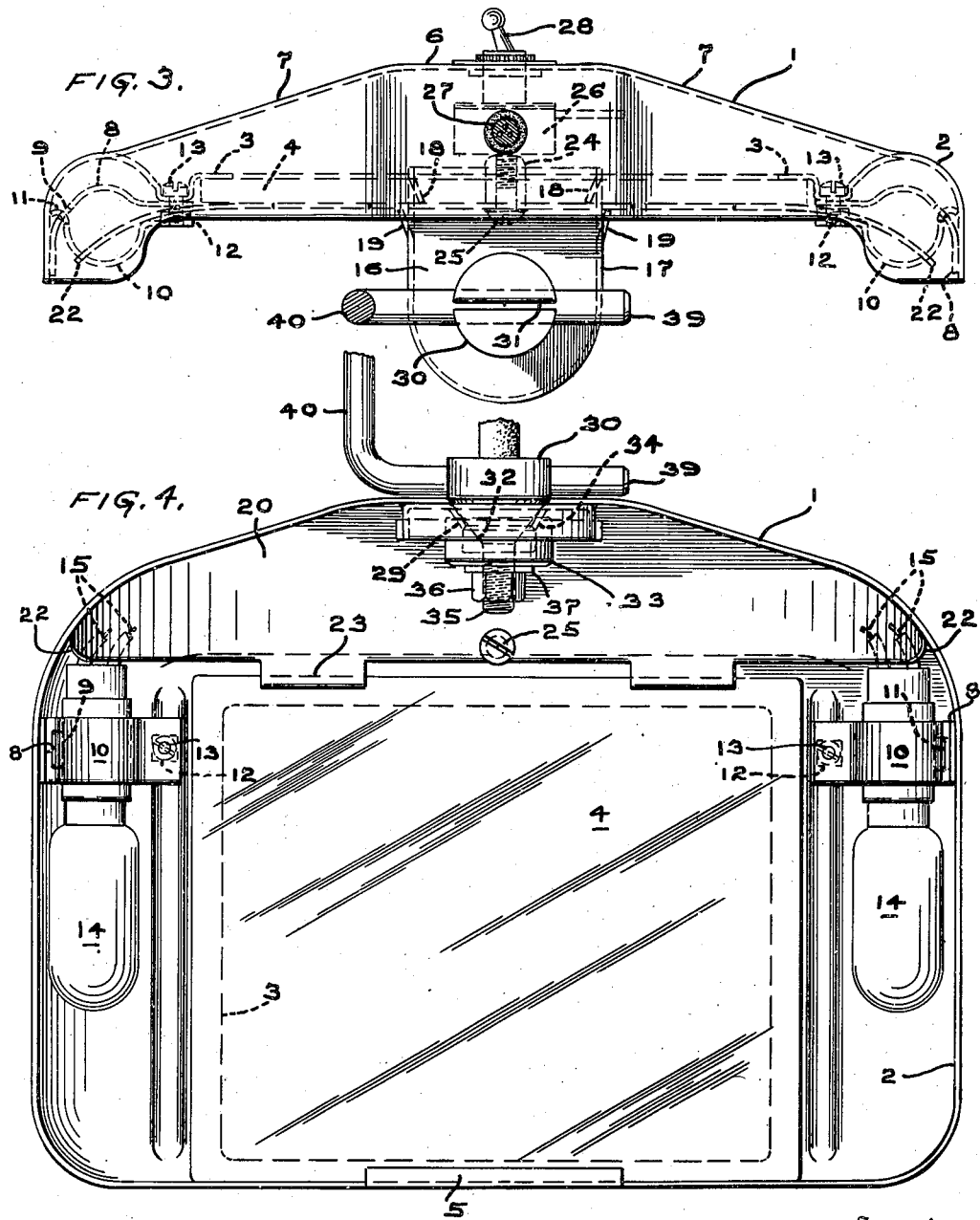
Inventor
Glenn C. Wilhide Patented Aug. 2, 1949

2,477,915

UNITED STATES PATENT OFFICE 2,477,915

ILLUMINATED EYESHIELD

Glenn C. Wilhide, Towson, Md., assignor to The Black and Decker Manufacturing Company, a corporation of Maryland Application May 2, 1946, Serial No. 666,593

4 Claims. (Cl. 51—272)

This invention relates to an illuminated eye shield or guard for protecting the eyes from flying particles from working machines, such as grinding stones, and it has as an object to provide a shield which may be readily adjusted to assume various positions with respect to the work to suit the convenience of the operator and which will effectively protect the eyes of the operator in all positions without obstructing his view.

Another object of the invention is to make such a shield from a minimum of stampings and other parts to promote economy of manufacture. Another object of the invention is to so mount the transparent panel in the shield or guard that it may be readily replaced and to likewise mount the lights for ready replacement.

Other objects and advantages of the new shield or guard will be apparent from the following description and the accompanying drawings in which:

Figure 1 is a side elevation of the shield or guard of this invention.

Figure 2 is a partial plan view of the shield.

Figure 3 is a rear elevational view thereof.

Figure 4 is an inverted plan view of the shield.

Figure 5 is a fragmentary view from the top of the shield support showing the means for supporting the cover plate.

Figure 6 is a sectional view on line 6—6 of Figure 5.

Figure 7 is a fragmentary view of the cover plate at the edge of its attachment with the shield's support.

In the drawings similar numerals refer to similar parts throughout the several views.

The shield or guard consists principally of a single stamped frame 1, having side sections 2 curved to form light reflectors opening downwardly. The shield has an inner or central section 3 forming a frame or top support for the transparent glass panel 4 around the four sides of the rectangular panel. The front of the shield has a lower backwardly turned lip 5 to hold the panel 4 in from the front.

The back of the frame 1 has a central upwardly projecting section 6 of rectangular formation and tapering sections 7 which join with the side reflectors 2. The shield has upper lamp holding bracket sections 8 welded in each reflector. These bracket sections have openings 9 therein, and other bracket sections 10 with tongues 11 thereon project into the openings 9 and form a circular bracket to hold the lamps in the reflectors. The inner end of the sections 10 of the brackets have a nut 12 welded thereto which is held in place by screw 13 passing thereto from the top of the frame. The bracket sections 8 and 10 hold the lamps 14 and the electrical cords 15 of these lamps pass backwardly into the rear section of the frame.

On the back of the rear section of the frame is a downwardly projecting support 16 which is welded to the back of the frame. This support has forwardly projecting flanges 17 which are cut and bent reversely to form tongues 18, bent inwardly, and 19 bent outwardly. This formation of the tongues presents slots in the flanges 17 on each side of the support 16. Into these slots fit the cover plate 20 shaped to close the rear section of the frame. This cover plate is cut out as shown at 21 to fit around the support 16. This structure is clearly shown in Figures 5, 6 and 7. The cover plate 20 is bent downwardly at its tips as at 22 to receive up under the tips the electric cords 15 from the lamps. The cover plate 20 has forwardly projecting lips 23 extending over the rear section of the glass panel 4 to hold it in place. A nut 24 is welded to the inner surface of the frame and into this nut passes screw 25 to hold the forward edge of the cover plate in place.

A switch 26 may be placed within the central part of the rear section of the frame and the wires 15 of the lamps would lead thereto and the cable 27 would lead therefrom. The switch might have a lever 28 projecting from the top of the frame. The switch is supported from the top of the frame 1 as shown in Figures 1 and 3. This switch could be omitted if desired.

The support 16 has an opening therein with inwardly projecting tapering flange 29. Plug member 30 which is split longitudinally at the back, as shown at 31 has a conical section 32 which fits snugly into the tapering flange 29. A washer 33, which is countersunk at its center as at 34 fits snugly over the flange 29. The plug 30 has extending from this conical section 32 a bolt section 35 to receive nut 36 and lock washer 37 may be used. The plug has at its rear or base a transverse opening 38 through which passes rod 39 of bracket 40 which may be attached to the casing of the machine, such as a grinder or other machine, the working operation of which is watched through the transparent panel 4. Tightening on the bolt will draw the plug 30 into tapering flange 29, to firmly grip rod 39 and into firm holding position with the support 16. By the use of the plug member and mounting as shown, a universal movement for adjustment of the shield or guard is possible and a rigid mounting in the adjusted position is provided.

It will be apparent that a shield or guard of a minimum number of parts and of the greatest simplicity of manufacture is provided and that changes may be made in the structure shown and described without departing from the invention.

What is claimed as new and is desired to be secured by Letters Patent is:

1. In a guarding device, a unitary sheet material frame, a transparent panel centrally located therein for observing work being performed, said frame having a rear section projecting upwardly from said panel forming a transverse strengthening member and comprising an upwardly, forwardly and rearwardly walled rectangular central portion and upwardly, forwardly and rearwardly walled tapering side portions extending therefrom, said frame having curved, downwardly opening light reflectors on each side of said panel, each of said reflectors being continuations of the small end of the tapering side portions, and being supported thereby, the curved reflectors and tapering portions making the frame rigid for the panel and means projecting from said rectangular central portion for adjustably supporting said frame with respect to the work.

2. In a guarding device, a unitary sheet frame, a transparent panel centrally located therein for observing work being performed, said frame having a rear section projecting upwardly from said panel, forming a transverse strengthening member said frame having curved, downwardly opening light reflectors on each side of said panel, a support projecting downwardly from the back of said rear section for supporting said frame with respect to the work, said support having a forwardly extending flange on each side thereof having spaced slots therein, a cover plate closing the bottom of said rear section and being supported at the rear in said slots and means to support the same at the forward edge, said cover plate extending over and supporting the transparent panel at its rear edge.

3. In a guarding device, a unitary sheet frame, a transparent panel centrally located therein for observing work being performed, said frame having a rear section projecting upwardly from said panel, forming a transverse strengthening member said frame having curved downwardly opening light reflectors on each side of said panel, a support projecting downwardly from the back of said rear section having an opening therein with an inturned tapered wall therearound, a conical longitudinally split plug in said opening with a bolt section projecting therethrough and a countersunk washer therearound, and a nut thereon, said plug having a transverse opening in its rear, a bracket in said opening, whereby, drawing up on the nut draws the plug within the washer and clamps the plug on the bracket and on the support, whereby universal movement is allowed for the adjustment of said frame with respect to the work.

4. In a guarding device, a unitary sheet frame, a transparent panel centrally located therein for observing work being performed, the frame having a downwardly and rearwardly directed lip at its front edge to support the front edge of the panel, said frame having a rear section projecting upwardly from said panel, forming a transverse strengthening member said frame having curved, downwardly opening light reflectors on each side of said panel and means concealed by and projecting from said rectangular central portion for adjustably supporting said frame with respect to the work, lamp sockets attached in and held by said reflectors, electric lamps in said sockets, a support projecting from each side of said concealed means, a cover plate closing the bottom of said rear section supported at the rear edge by said support from each side of the concealed means and means to support the plate at its forward edge, wires for said lamps passing into said rear section and being supported adjacent the lamps by said cover plate, said plate also extending over the rear edge of the transparent panel and supporting the same at the rear edge.

GLENN C. WILHIDE.

REFERENCES CITED

The following references are of record in the file of this patent:

UNITED STATES PATENTS

| Number | Name | Date |
|---|---|---|
| 2,217,501 | Teichner | Oct. 8, 1940 |